United States Patent
Zhang et al.

(10) Patent No.: US 10,308,107 B2
(45) Date of Patent: Jun. 4, 2019

(54) MULTI-MODE HYBRID POWERTRAIN

(71) Applicant: Ford Global Technologies, LLC, Dearborn, MI (US)

(72) Inventors: Xiaowu Zhang, Canton, MI (US); David Gon Oh, Ann Arbor, MI (US); David Allen Janson, Plymouth, MI (US); Mark John Jennings, Saline, MI (US); Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 15/789,308

(22) Filed: Oct. 20, 2017

(65) Prior Publication Data
US 2019/0118641 A1 Apr. 25, 2019

(51) Int. Cl.
*B60K 6/50* (2007.10)
*B60K 6/543* (2007.10)
*B60K 6/365* (2007.10)
*B60K 6/387* (2007.10)
*F16H 3/72* (2006.01)

(52) U.S. Cl.
CPC .............. *B60K 6/543* (2013.01); *B60K 6/365* (2013.01); *B60K 6/387* (2013.01); *F16H 3/728* (2013.01); *B60Y 2200/92* (2013.01); *B60Y 2400/42* (2013.01); *B60Y 2400/73* (2013.01); *F16H 2200/0043* (2013.01); *F16H 2200/201* (2013.01); *F16H 2200/2043* (2013.01); *Y10S 903/911* (2013.01); *Y10S 903/914* (2013.01); *Y10S 903/918* (2013.01)

(58) Field of Classification Search
None
See application file for complete search history.

(56) References Cited

U.S. PATENT DOCUMENTS

| | | | |
|---|---|---|---|
| 7,500,930 B2 | 3/2009 | Raghavan et al. | |
| 7,670,242 B2 * | 3/2010 | Bucknor | B60K 6/40 475/5 |
| 8,066,609 B2 | 11/2011 | Kersting | |
| 8,246,501 B2 * | 8/2012 | Phillips | B60K 6/445 475/5 |
| 8,287,427 B2 | 10/2012 | Sah et al. | |
| 8,398,514 B2 * | 3/2013 | Phillips | B60K 6/365 475/290 |
| 9,499,039 B2 | 11/2016 | Lee et al. | |
| 9,656,659 B2 | 5/2017 | Shukla et al. | |
| 2006/0276288 A1 * | 12/2006 | Iwanaka | B60K 6/365 475/5 |

FOREIGN PATENT DOCUMENTS

DE 102010034288 A1 * 4/2011 ............. B60K 6/365

* cited by examiner

*Primary Examiner* — Dirk Wright
(74) *Attorney, Agent, or Firm* — David Kelley; Brooks Kushman P.C.

(57) ABSTRACT

A transmission includes first, second, and third planetary gear sets (PGS). A first electric machine is fixedly coupled to a sun gear of the first PGS. A second electric machine is fixedly coupled to a carrier of the first PGS. A brake is selectively holding a ring gear of the first PGS against rotation. First and second clutches selectively couple the first and second electric machines, respectively, to a portion of the second and third PGS, respectively.

20 Claims, 3 Drawing Sheets

MULTI-MODE HYBRID POWERTRAIN

TECHNICAL FIELD

The present disclosure generally relates to automatic transmissions and powertrains for motor vehicles. More specifically, the present disclosure relates to an arrangement of gears, clutches, and the interconnections among them in a power transmission of a hybrid vehicle.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

SUMMARY

In one embodiment, a transmission for a hybrid vehicle includes an input, an output, a first electric machine, and a second electric machine. A first planetary gear set has a first sun gear fixedly coupled to the first electric machine, a first carrier fixedly coupled to the second electric machine, and a first ring gear fixedly coupled to the input. A second planetary gear set has a second planetary gear set having a second sun gear fixedly coupled to the first carrier, a second carrier, and a second ring gear. A third planetary gear set has a third sun gear, a third carrier, and a third ring gear fixedly coupled to the output.

In another embodiment, a transmission includes an input, an output, and first and second electric machines (EMs). A first planetary gear set has a ring gear fixedly coupled to the input, and a carrier fixedly coupled to the second EM. A second planetary gear set has a gear component selectively coupled to the first EM, and a sun gear fixedly coupled to the carrier. A third planetary gear set has a ring gear fixedly coupled to the output.

In yet another embodiment, a transmission includes first, second, and third planetary gear sets (PGS). A first electric machine is fixedly coupled to a sun gear of the first PGS. A second electric machine is fixedly coupled to a carrier of the first PGS. A brake is selectively holding a ring gear of the first PGS against rotation. First and second clutches selectively couple the first and second electric machines, respectively, to a portion of the second and third PGS, respectively.

DETAILED DESCRIPTION

Figure 1:
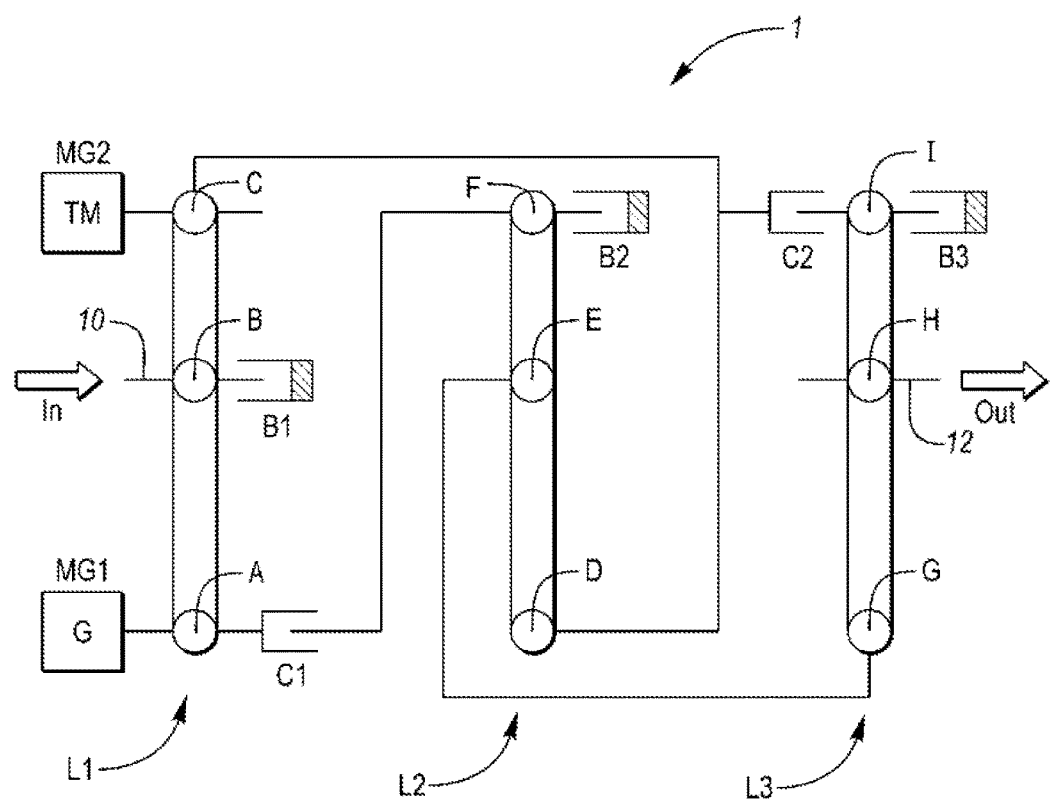
FIG. 1 is a schematic lever diagram representing interconnections among components of a transmission, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements (e.g., gears) and shift elements (e.g., clutches, brakes) configured to impose specified speed relationships among the rotating elements. Some speed relationships, called fixed speed relationships, are imposed regardless of the state of any shift elements. In a fixed speed relationship, the rotational speed of one component is directly proportional to the rotational speed of the other component when they are rotating. Other speed relationships, called selective speed relationships, are imposed only when particular shift elements are fully engaged. For example, if gear A is selectively connected to gear B via shift element X, gear A can rotate independent of gear B when shift element X is not engaged, and can rotate along with gear element B when shift element X is engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A proportional speed relationship between two elements when the ratio between the speeds of the elements is a predetermined value. A proportional speed relationship between a first element and a second element is an overdrive relationship if the second element always rotates faster than and in the same direction as the first element. Similarly, a proportional speed relationship between a first element and a second element is an underdrive relationship if the second element always rotates slower than and in the same direction as the first element.

A group of rotating elements are fixedly coupled to one another if they are constrained to rotate as a unit in all operating conditions. Rotating elements can be fixedly coupled by spline connections, welding, press fitting, machining from a common solid, or other means. A direct connection between two rotating elements means that no other rotating elements exist between the two rotating elements. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled; they are directly coupled if no other rotating elements exist in a torque flow path between the two rotating elements.

An element is a transmission input if it is adapted to be fixedly coupled to either a power source or the output of a launch device. A power source may be, for example, an internal combustion engine or an electric motor. A launch device may be, for example, a torque converter or a launch clutch. The input may be coupled to the power source or launch device via a damper designed to absorb torsional vibrations. An element is a transmission output if it is adapted to transmit power to components outside the transmission such as vehicle wheels. There may be a fixed speed ratio other than 1:1 between the output element and the driven component.

For hybrid vehicles, electrically-variable transmissions (EVTs) are known. An EVT uses one or more electric machines (e.g., electric motors) to control its speed ratio, providing the EVT with a continuous choice of ratios. The input, output, and electric motors can be connected to planetary gearing. In a set of planetary gears, the speed of a planet carrier is the weighted average of the speeds of its sun gear and its ring gear. When the vehicle or transmission is operating in an EVT mode, the speed of the transmission output is a weighted average of the speeds of the engine and the electric motors, as combined by the planetary gearing. A vehicle having an EVT can be driven by the electric motor with the engine standing still (providing a transmission ratio of zero), or the engine can be running while connected to the output with the vehicle standing still (providing a transmission ratio of infinity), or the EVT can operate anywhere in between.

Both demand and competition for better performance, fuel economy, and drivability with respect to hybrid vehicles has grown in recent years. For high performance vehicles or heavy duty vehicles, current power-split architecture may require a large traction motor to satisfy torque requirements.

Therefore, according to various embodiments of the present disclosure, a multi-mode hybrid powertrain system and transmission is provided to address these facts. In one embodiment, the transmission system has four EVT modes, three fixed gear ratio modes, and four electric-vehicle (EV) modes. This can deliver significantly higher output torque using similarly-sized electric machines compared to other currently available hybrid architecture. The design disclosed herein improves noise, vibration, harshness (NVH), and increases regenerative braking capabilities.

An example of a transmission (and surrounding structure as part of an overall powertrain) is schematically illustrated in the figures described in the following text, according to embodiments. In this transmission, an input 10 is driven by the engine, via a launch device such as a torque converter or launch clutch in some embodiments. An output 12 transmits rotational torque out of the transmission and towards a differential, for example. An additional gear or sprocket (not shown) may transmit power from the output to the differential located on a third axis.

FIG. 1 is a lever diagram having three levers L1, L2, L3 representing transmission 1. The first lever L1, the second lever L2, and the third level L3 correspond to the first gear set 20, the second gear set 30, and the third gear set 40, respectively, in FIGS. 2-3. In one embodiment, on the first lever L1, node A represents sun gear 26, node B represents ring gear 28, and node C represents carrier 22 that shares a common connection to the motor MG2 and sun gear 36. On the second lever L2, node D represents sun gear 36, node E represents carrier 32 that shares a connection with sun gear 46, and node F represents ring gear 38. On the third lever L3, node G represents sun gear 46, node H represents ring gear 48, and node I represents carrier 42.

Figure 2:
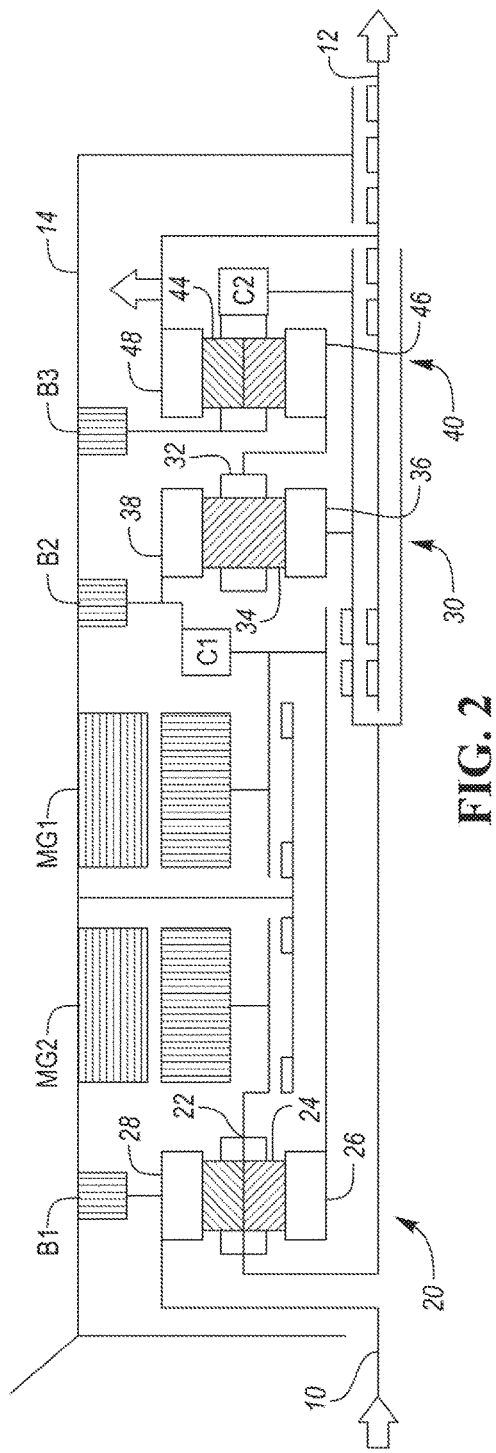
FIG. 2 is a schematic diagram illustrating the kinematic arrangement of one embodiment of the transmission diagrammed in FIG. 1, incorporating planetary gear sets.

FIG. 2 is a schematic diagram illustrating one embodiment of a kinematic arrangement the transmission diagrammed in FIG. 1. The transmission of FIG. 2 utilizes three simple planetary gear sets 20, 30, and 40, two clutches C1, C2, and three brakes B1, B2, B3 having a part thereof connected to a fixed housing 14. A simple planetary gear set is a type of fixed gearing arrangement. A planet carrier 22 rotates about a central axis and supports a set of planet gears 24 such that the planet gears rotate with respect to the planet carrier. External gear teeth on the planet gears 24 mesh with external gear teeth on a sun gear 26 and with internal gear teeth on a ring gear 28. The sun gear 26 and ring gear 28 are supported to rotate about the same axis as the carrier. A simple planetary gear set imposes a fixed speed relationship. The speed of the carrier is constrained to be between the speed of the sun gear and the speed of the ring gear. More specifically, the speed of the carrier is a weighted average of the speed of the sun gear and the speed of the ring gear with weighting factors determined by the number of teeth on each gear. Similar speed relationships are imposed by other known types of fixed gearing arrangements that may be implemented in other exemplary embodiments of the present disclosure. For example, a double pinion planetary gear set constrains the speed of the ring gear to be a weighted average between the speed of the sun gear and the speed of the carrier. Gear sets 30 and 40 are similarly structured, each with respective planet carriers 32, 42, planet gears 34, 44, sun gears 36, 46, and ring gears 38, 48.

In the illustrated embodiment, the input 10 is fixedly coupled to the ring gear 28, which is selectively held against rotation by brake B1. Therefore, when engaged, the brake B1 can prevent the engine output from transmitting downstream in the transmission, allowing for at least one electric machines MG1 and/or MG2 (described below) to propel the vehicle in an EV mode. This is shown in the shift chart table in FIG. 4. The first electric machine MG1 is fixedly coupled to the sun gear 26, and the second electric machine MG2 is fixedly coupled to the carrier 22. Thus, two electric machines are provided. In one embodiment, MG1 operates as a generator and MG2 operates as a motor. The carrier 22 is fixedly connected via a shaft to sun gear 36. The sun gear 26 is selectively coupled to the ring gear 38 by clutch C1. The carrier 32 is fixedly connected to the sun 46 via a shaft. The ring gear 38 is selectively held against rotation by brake B2. The shaft that connects the carrier 22 to the sun gear 36 is also selectively connected to the carrier 42 via clutch C2. The carrier 42 is also selectively held against rotation by brake B3. Ring gear 48 is fixedly connected to the output 12.

In the embodiment of FIG. 2, both of the planetary gear sets 20 and 40 are double pinion gear sets. With such an arrangement, the planetary gear set 20 has a circumferential set of two meshed planets gears 24 that engage one another radially between the sun gear 26 and the ring gear 28. The same arrangement is present in the planetary gearset 40, with two planet gears 44 meshing with one another between the sun gear 46 and the ring gear 48. The other planetary gear set 30 is a simple planetary gear set with a circumferential set of single planet gears directly meshing with the sun gear 36 and the ring gear 38.

Figure 3:
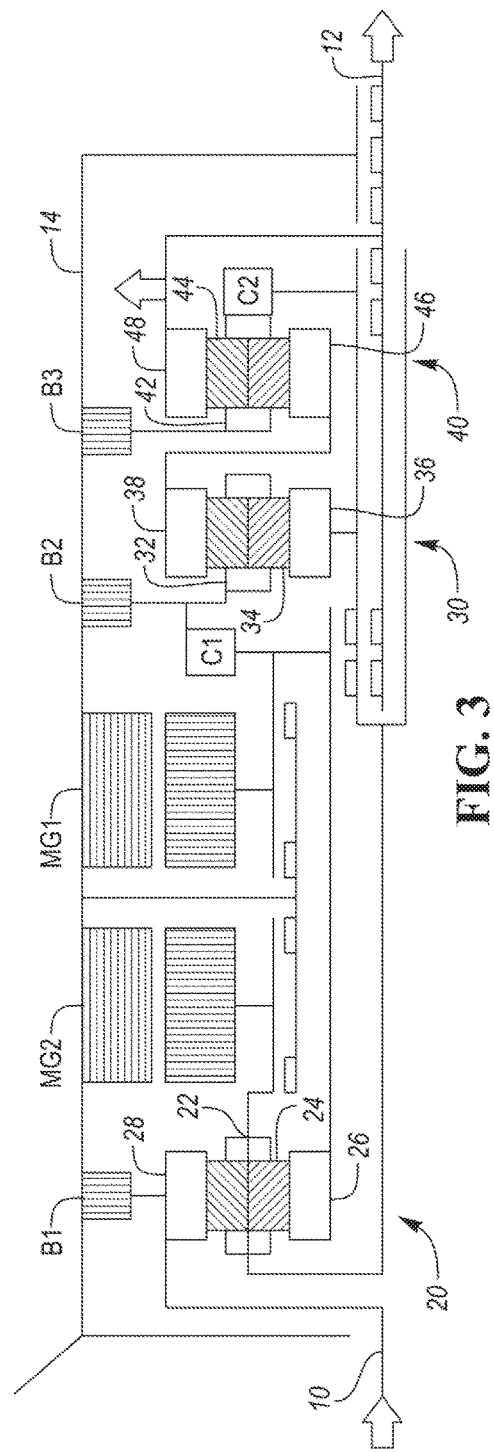
FIG. 3 is a schematic diagram illustrating the kinematic arrangement of another embodiment of the transmission diagrammed in FIG. 1, incorporating planetary gear sets in another embodiment.

FIG. 3 is an alternative embodiment to the schematic illustration of FIG. 2. In FIG. 3, the planetary gear set 30 is now a double pinion gear set with a circumferential set of two meshed planets gears 34 instead of a single planet gear. In this embodiment, the ring gear 38 now connects to the sun gear 46. The carrier is selectively held against rotation by the brake B2, and is selectively connected to the electric machine MG1 by clutch C1.

Figures 4, 5:
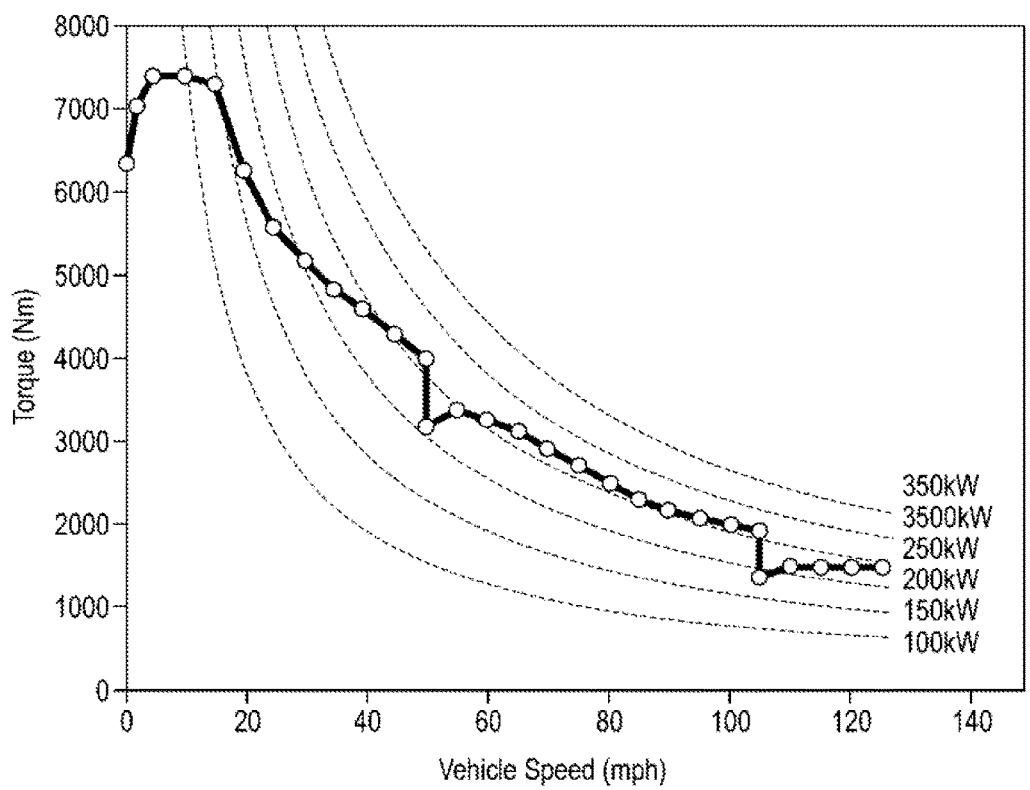
FIG. 4 is a shift chart table, showing one embodiment of various driving modes that are enabled when two or three shift elements are engaged, as shown by an "X".
FIG. 5 is a graphical representation of the torque outputs of the transmission based on vehicle speed, according to one embodiment.

FIG. 4 illustrates a shift chart table. Engaging shift elements (C1, C2, C3, B1, B2, B3) in combinations of two or three establishes four EVT modes, three fixed gear (FG) modes, and four electric vehicle (EV) modes. In the EV modes, the engine may be disabled and the motor(s) can be the sole source of propulsive power. An "X" indicates that the shift element is required to establish the drive mode.

FIG. 5 shows a graph of the torque outputs of the transmission 1 that varies as the speed of the vehicle varies, according to one embodiment. This graph assumes the vehicle is provided with a 100 kW maximum battery output. As can be seen, torque outputs over 3000 nM are available in speeds as high as 70 mph.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission for a hybrid vehicle, comprising:
   an input;
   an output;
   a first electric machine;
   a second electric machine
   a first planetary gear set having a first sun gear fixedly coupled to the first electric machine, a first carrier fixedly coupled to the second electric machine, and a first ring gear fixedly coupled to the input;
   a second planetary gear set having a second carrier, a second ring gear, and a second sun gear fixedly coupled to the first carrier; and
   a third planetary gear set having a third sun gear, a third carrier, and a third ring gear fixedly coupled to the output.

2. The transmission of claim 1, further comprising a brake configured to selectively hold the first ring gear against rotation.

3. The transmission of claim 1, further comprising a clutch configured to selectively couple the first electric machine to the second ring gear.

4. The transmission of claim 3, further comprising a brake configured to selectively hold the second ring gear against rotation.

5. The transmission of claim 1, wherein the second carrier is fixedly coupled to the third sun gear.

6. The transmission of claim 1, further comprising a clutch configured to selectively couple the first electric machine to second carrier.

7. The transmission of claim 6, further comprising a brake configured to selectively hold the second carrier against rotation.

8. The transmission of claim 1, wherein the second ring gear is fixedly coupled to the third sun gear.

9. The transmission of claim 1, further comprising a brake configured to selectively hold the third carrier against rotation.

10. The transmission of claim 1, further comprising a clutch configured to selectively couple the first carrier to the third carrier.

11. A transmission comprising:
an input;
an output;
first and second electric machines (EMs);
a first planetary gear set having a ring gear fixedly coupled to the input, and a carrier fixedly coupled to the second EM;
a second planetary gear set selectively coupled to the first EM and a sun gear fixedly coupled to the carrier; and
a third planetary gear set having a ring gear fixedly coupled to the output.

12. The transmission of claim 11, further comprising a clutch configured to selectively couple the first EM to a ring gear of the second planetary gear set, and a brake configured to selectively hold the ring gear of the second planetary gear set against rotation.

13. The transmission of claim 12, wherein the second planetary gear set includes a carrier that is fixedly coupled to a sun gear of the third planetary gear set.

14. The transmission of claim 11, further comprising a clutch configured to selectively couple the first EM to a carrier of the second planetary gear set, and a brake configured to selectively hold the carrier of the second planetary gear set against rotation.

15. The transmission of claim 14, wherein the second planetary gear set includes a ring gear fixedly coupled to a sun gear of the third planetary gear set.

16. The transmission of claim 11, wherein the first planetary gear set includes a sun gear fixedly coupled to the first EM.

17. The transmission of claim 11, further comprising a brake configured to selectively hold the ring gear of the first planetary gear set against rotation.

18. The transmission of claim 11, further comprising a brake configured to selectively hold a carrier of the third planetary gear set against rotation.

19. The transmission of claim 11, further comprising a clutch configured to selectively couple the carrier of the first planetary gear set and the sun gear of the second planetary gear set to a carrier of the third planetary gear set.

20. A transmission comprising:
first, second, and third planetary gear sets (PGS);
a first electric machine fixedly coupled to a sun gear of the first PGS;
a second electric machine fixedly coupled to a carrier of the first PGS;
a brake selectively holding a ring gear of the first PGS against rotation; and
first and second clutches selectively coupling the first and second electric machines, respectively, to a portion of the second and third PGS, respectively.

* * * * *